Nov. 26, 1968  E. HÖRMANN  3,413,432
APPARATUS FOR THE FORMATION OF LOCAL, CIRCUMFERENTIAL
ENLARGEMENTS ON HOLLOW CYLINDRICAL BODIES
Filed Nov. 22, 1966  2 Sheets-Sheet 1
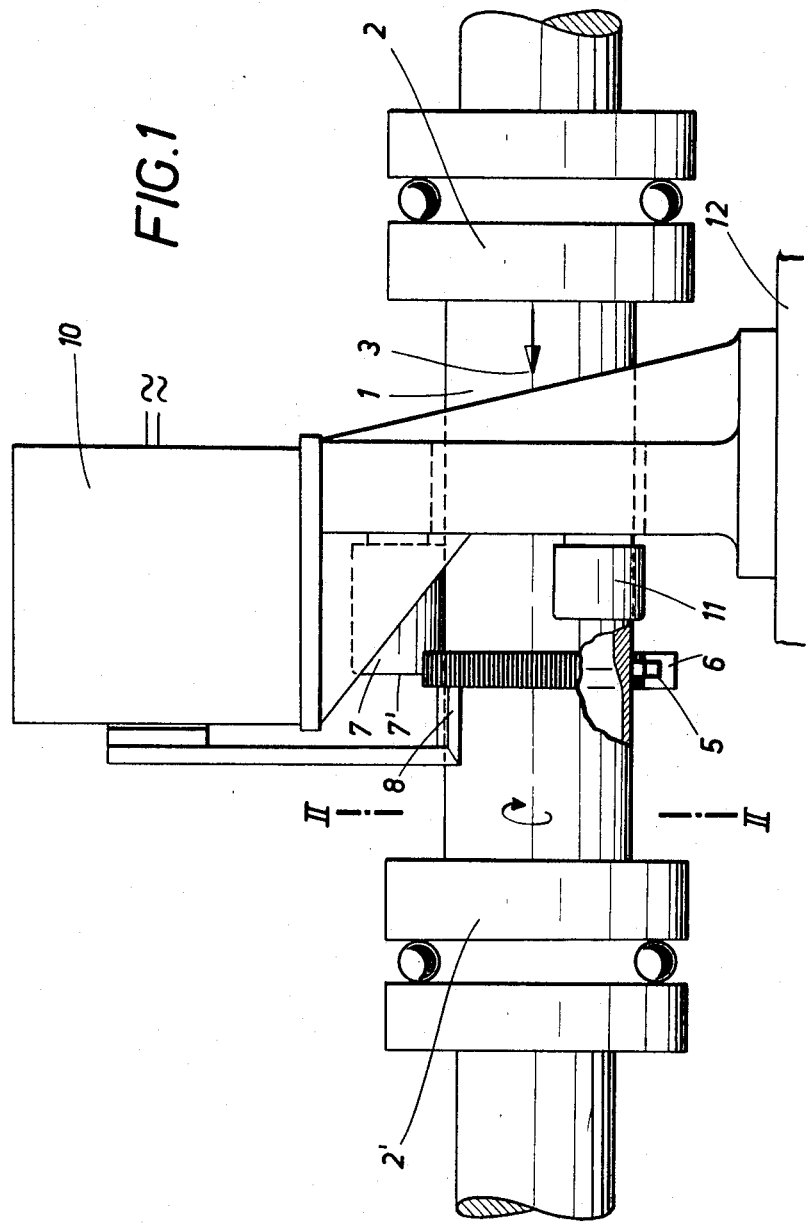
INVENTOR.
ERICH HÖRMANN
BY Kurt Kelman
AGENT

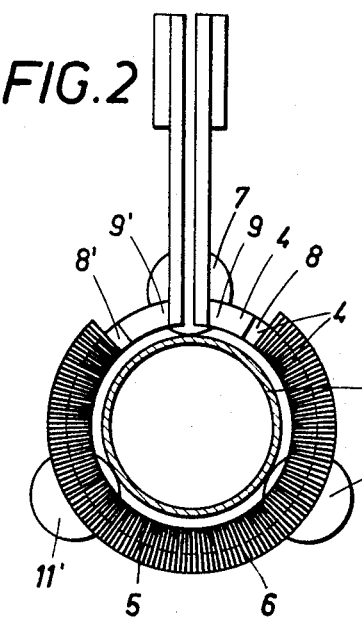
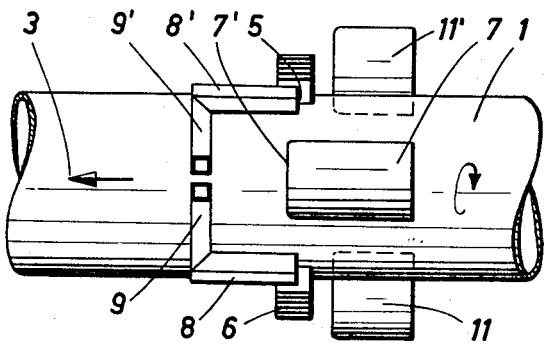
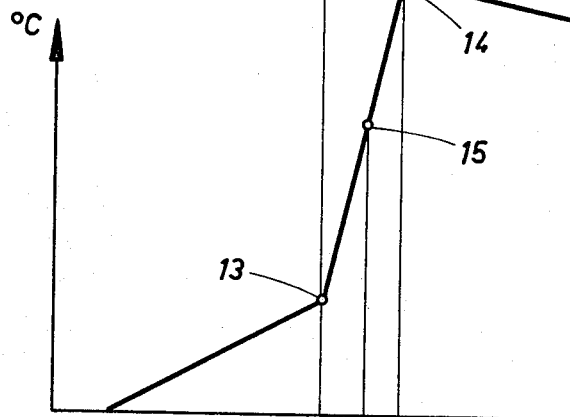

United States Patent Office 3,413,432
Patented Nov. 26, 1968

3,413,432
APPARATUS FOR THE FORMATION OF LOCAL, CIRCUMFERENTIAL ENLARGEMENTS ON HOLLOW CYLINDRICAL BODIES
Erich Hörmann, Dusseldorf, Germany, assignor to Gesellschaft fur Fertigungstechnik und Maschinenbau Gesellschaft m.b.H, Steyr, Austria
Filed Nov. 22, 1966, Ser. No. 596,296
Claims priority, application Germany, Feb. 9, 1966, P 38,734
6 Claims. (Cl. 219—7.5)

This invention relates to apparatus for the formation of local, circumferential enlargements on hollow cylindrical bodies by an axially advancing inductive heating, which is effected by an arcuate heating inductor, which concentrically surrounds a part of the hollow cylindrical body and is spaced from it by a small coupling gap, and by the application of an axial upsetting pressure on the rotating hollow cylindrical body simultaneously with the action of at least one radially movable press-forming roll, which is disposed in a peripheral portion left open between the ends of the arcuate heating inductor and defines the heated arcuate portions. The hollow cylindrical bodies may consist of tubes or bushings. The enlargements may be required for various purposes, e.g., for stiffening the cylindrical body or for enlarging the wall at the end of a tube in order to provide an adequate supply of material for machining or mechanical working operations, such as boring, milling, thread-cutting, forging or pressing.

Devices are known in which a narrow zone of a hollow cylindrical body is subjected to local induction heating by means of a heating inductor, an axial upsetting pressure effective throughout the periphery of the workpiece is applied while the workpiece is rotating and one radially movable press-forming roll or a plurality of such rolls limit the heated arcuate portions. The heating and rolling devices are capable of a movement in unison in the direction of the axis of the workpiece and enable the formation of enlargements of any desired shape.

These known devices have the disadvantage that the press-forming rolls are surrounded by the heating inductor. As a result, there are only relatively short, effective portions of the heating inductor between the press-forming rolls. As the heating power increases with the size of that portion of the heating inductor which is close to the workpiece, the known devices remain considerably below the optimum. In the known arrangement, the press-forming rolls and partly even the centering rollers are heated too so that the heating power which can be transferred is further reduced.

It is an object of the invention to eliminate these disadvantages. This object is accomplished in that the heating inductor defines an angular gap and adjacent to said gap by-passes the press-forming roll in axial and circumferential directions. As a result, virtually the entire periphery of the tube is surrounded by the heating inductor with high effectiveness and the press-forming roll, which is disposed outside the heating inductor, is not heated so that the maximum heating power can be supplied to the workpiece.

That portion of the heating inductor which by-passes the press-forming roll in axial and circumferential directions is preferably disposed ahead of the press-forming roll when viewed in the feeding direction. In this case a preheating is possible in this region. The heating inductor may consist of an arcuate heating inductor, which is carried by two straight heating conductor portions, which extend parallel to the axis of the hollow cylinder and are connected to the source of power. The straight heating conductor portions are preferably rigidly connected each to a curved heating conductor portion, which is connected to the source of power and surrounds the hollow cylinder with the same spacing as the arcuate heating inductor. In this case virtually the entire hollow cylinder is effectively surrounded by the heating inductor. The heating to the temperature required for a deformation is effected adjacent to the arcuate heating inductor, which concentrically conforms to the periphery of the hollow cylinder and which may be provided with yoke laminations for concentrating the magnetic field. The press-forming roll is arranged in such a manner that it contacts the workpiece in a portion in which the workpiece begins to flow under the axial pressure. For this reason, the forward end face of the press-forming roll lies on the same circumferential line as the forward edge of the arcuate heating inductor. The press-forming roll may be supported by two offset backing rollers, which roll on the press-forming roll and take up the bending moment.

For guiding and centering the hollow cylinder, two centering rollers, which are spaced 120° from the press-forming rolls, may be disposed outside the heating inductor. Those surfaces of the press-forming roll and of the centering rollers which act on the periphery of the tube may overlap in a short region as the press-forming roll is much longer than the centering rollers. As a result, the centering rollers are not appreciably heated by vagabond induction currents so that the power losses can be minimized. Owing to the overlap of the press-forming roll and the centering rollers, the hollow cylinder can be centered to be free of any moment. Instead of two centering rollers spaced 120° from the press-forming roll, five centering rollers may be provided which are spaced 60° from each other and from the press-forming roll.

By a system of levers, the press-forming roll and the centering rollers are set in unison to the outside diameter of the hollow cylinder or to the desired diameter of the enlargement to be formed on the outside by upsetting. In this way, the press-forming roll limits the diameter of the outside upset enlargement as desired whereas the thickness of the inside upset enlargement will depend on the upsetting temperature, the upsetting pressure and the feeding rate of the heating and forming device, which moves axially along the hollow cylinder.

The angular gap is disposed at the top in the illustrative embodiment. This portion may have any desired configuration and may be disposed at any point of the heating inductor.

A preferred embodiment of the apparatus according to the invention is shown in the accompanying drawings, in which:

FIG. 1 is a side elevation showing the apparatus,
FIG. 2 is a sectional view taken on line II—II of FIG. 1,
FIG. 3 is a top plan view showing the apparatus, and
FIG. 4 is a curve showing the temperature change in the locally heated tube wall.

According to FIGS. 1 to 3, the tube or the hollow cylinder 1 is gripped between the gripping heads 2 and 2' and is rotated. One gripping head 2 applies an axial upsetting force in the axial direction 3 to the hollow cylinder 1. The other gripping head 2' is fixed in the axial direction. The heating inductor 4 comprises an arcuate heating inductor 5, which surrounds a major part of the periphery of the tube. The arcuate inductor extends as far as to the press-forming roll 7 and is provided with yoke laminations 6 for concentrating the magnetic field. The arcuate heating inductor 5 is carried by two straight heating conductor portions 8 and 8', which are parallel to the tube axis. The straight heating conductor portions 8, 8' are carried by curved heating conductor portions 9, 9′, which concentrically conform to the periphery of the hollow cylinder 1 and are spaced from it by the same distance as the arcuate heating inductor 5. By connections which are not identified, the curved heating conductor portions are connected to the power source, e.g., the coupling transformer 10. Two centering rollers 11 and 11′ are spaced 120° from the press-forming roll and disposed outside of the inductor. The heating device and the forming device move in unison in the axial direction 3 on a diagrammatically indicated guide bed 12.

FIG. 4 shows only the arcuate heating inductor 5, which effects the local heating to the temperature required for a deformation, whereas the heating conductor portions 8, 8′ and 9, 9′ are not shown in this figure. By these portions, the wall of the tube which is rotated and moved in the axial direction 3 is preheated to a lower temperature 13. Adjacent to the arcuate heating inductor 5 the temperature rises to an upper value 14, which is reached at the end of the inductor. At this upper temperature value, the axial force effects a maximum upsetting of the tube wall. The deformation begins at an intermediate temperature 15, where the axial force which is applied overcomes the resistance of the workpiece to deformation. For this reason it is sufficient if the action of the press-forming roll 7 begins in this area. This is achieved in that the forward end face 7′ of the press-forming roll coincides approximately with the forward edge 5′ of the arcuate heating inductor 5. As a result, the press-forming roll is only insignificantly heated by vagabond induction currents and the power losses are minimized.

If the feeding rate of the heating and forming devices and the upsetting force are maintained constant, the heating power of the inductor may be controlled and regulated in known manner. In this case the size of the upset enlargement will depend on the temperature attained by the workpiece and its resistance to deformation. Any desired configuration of the upset enlargement may be obtained by a program control carried out in response to the displacement of the heating and forming devices.

When the apparatus which has been described by way of example is to be utilized for forming enlargements at tube ends, it will be sufficient to replace the gripping heads 2 and 2′ shown in the drawing by special heads, which enable the heating and forming devices to move beyond the tube ends. This does not require a change of the structure of the apparatus according to the invention.

What is claimed is:

1. Apparatus for the formation of local, circumferential enlargements on hollow cylindrical bodies, which comprises mounting means defining an axis of rotation and adapted to mount said hollow cylindrical body for coaxial rotation about said axis, means for rotating said body about said axis of rotation when said body is thus mounted, force-applying means for applying an axial upsetting pressure to said body when the same is thus mounted and rotated, an arcuate heating inductor which concentrically surrounds said axis of rotation in a plane which intersects a press-forming roll means, said arcuate heating inductor having ends defining an angular gap with respect to said axis of rotation, press-forming roll means which extend parallel to said axis of rotation and are radially movable with respect to said axis of rotation in said angular gap, heating conductor means electrically connected to said arcuate heating inductor and by-passing said press-forming roll means in axial and circumferential directions with respect to said axis of rotation, and traversing means for moving said press-forming roll means, arcuate heating inductor, and heating conductor means in unison along said axis of rotation.

2. Apparatus as set forth in claim 1, for the formation of local circumferential enlargements on hollow cylindrical bodies having substantially a predetermined diameter, in which apparatus said arcuate heating inductor and said heating conductor means are arranged to be closely spaced from the outside periphery of said body when the same is mounted on said mounting means, and said press-forming roll means are radially movable to a position in which it defines the desired outside diameter of the portion of said body formed with said enlargement.

3. Apparatus as set forth in claim 2, in which said traversing means is operable to move said press-forming roll means, arcuate heating conductor, and heating conductor means in a predetermined direction along said axis of rotation during the formation of said enlargement and said heating conductor means axially and circumferentially by-passes that end of said press-forming roll means which leads in said predetermined direction.

4. Apparatus as set forth in claim 1, in which said heating conductor means comprise two straight heating conductor portions, which carry said arcuate heating inductor and extend parallel to said axis of rotation, and which comprises a source of power electrically connected to said heating conductor means.

5. Apparatus as set forth in claim 4, in which said source of power comprises a coupling transformer connected to said heating conductor means.

6. Apparatus as set forth in claim 4, in which said heating conductor means comprises two arcuate heating conductor portions, which have the same radial spacing from said axis of rotation as said arcuate heating inductor and each of which is rigid with one of said straight heating conductor portions and electrically connects the same to said source of power.

References Cited

UNITED STATES PATENTS

| | | | |
|---|---|---|---|
| 2,452,974 | 11/1948 | Westin et al. | 72—342 |
| 2,889,448 | 6/1959 | Hampton | 219—7.5 |
| 3,198,928 | 8/1965 | Allison | 72—342 X |

RICHARD J. HERBST, *Primary Examiner.*